United States Patent [19]

Ishizuka et al.

[11] Patent Number: 5,592,280
[45] Date of Patent: Jan. 7, 1997

[54] SHEET BINDING APPARATUS CAPABLE OF PERFORMING TWO KINDS OF BINDING PROCESSES

[75] Inventors: Daisuke Ishizuka, Yokohama; Akiyoshi Kimura, Kawasaki; Yoshiyuki Suzuki, Yokohama; Tadashi Suzuki, Tokyo; Shinichi Nakamura, Kawasaki; Yoshihiko Suzuki, Tokyo; Minoru Nada, Kawasaki; Satoru Kutsuwada, Yokohama; Kenji Kobayashi, Tokyo; Satoshi Kaneko; Syokyo Koh, both of Kawasaki; Norifumi Miyake, Tokyo; Hirohiko Tashiro, Yokohama, all of Japan

[73] Assignee: Canon Kabushiki Kaisha, Tokyo, Japan

[21] Appl. No.: 505,145

[22] Filed: Jul. 21, 1995

[30] Foreign Application Priority Data

Jul. 25, 1994 [JP] Japan .................................. 6-172199

[51] Int. Cl.[6] .................................................. C03G 15/00
[52] U.S. Cl. ...................... 399/410; 227/155; 270/58.08; 358/296; 399/82
[58] Field of Search ..................................... 355/313, 324; 270/53, 58.08, 58.09; 358/296; 227/78, 155, 156

[56] References Cited

U.S. PATENT DOCUMENTS

| 2,083,227 | 6/1937 | Drypolcher | 227/155 X |
| 4,946,154 | 8/1990 | Nakamura | 270/58.08 |
| 5,187,534 | 2/1993 | Iwata et al. | 355/324 |

*Primary Examiner*—Joan H. Pendegrass
*Attorney, Agent, or Firm*—Fitzpatrick, Cella, Harper & Scinto

[57] ABSTRACT

A sheet stapling apparatus includes a storage unit for storing sheets ejected out from an image forming apparatus, and a stapling unit for stapling to the sheets stored in the storage unit. The sheet stapling apparatus can execute a first bending process for bending the feet of a staple which were pierced through the sheets to the inside and a second bending process for bending the feet of the staple which were pierced through the sheets to the outside. In the facsimile mode or the printer mode, the second bending process is executed.

18 Claims, 15 Drawing Sheets

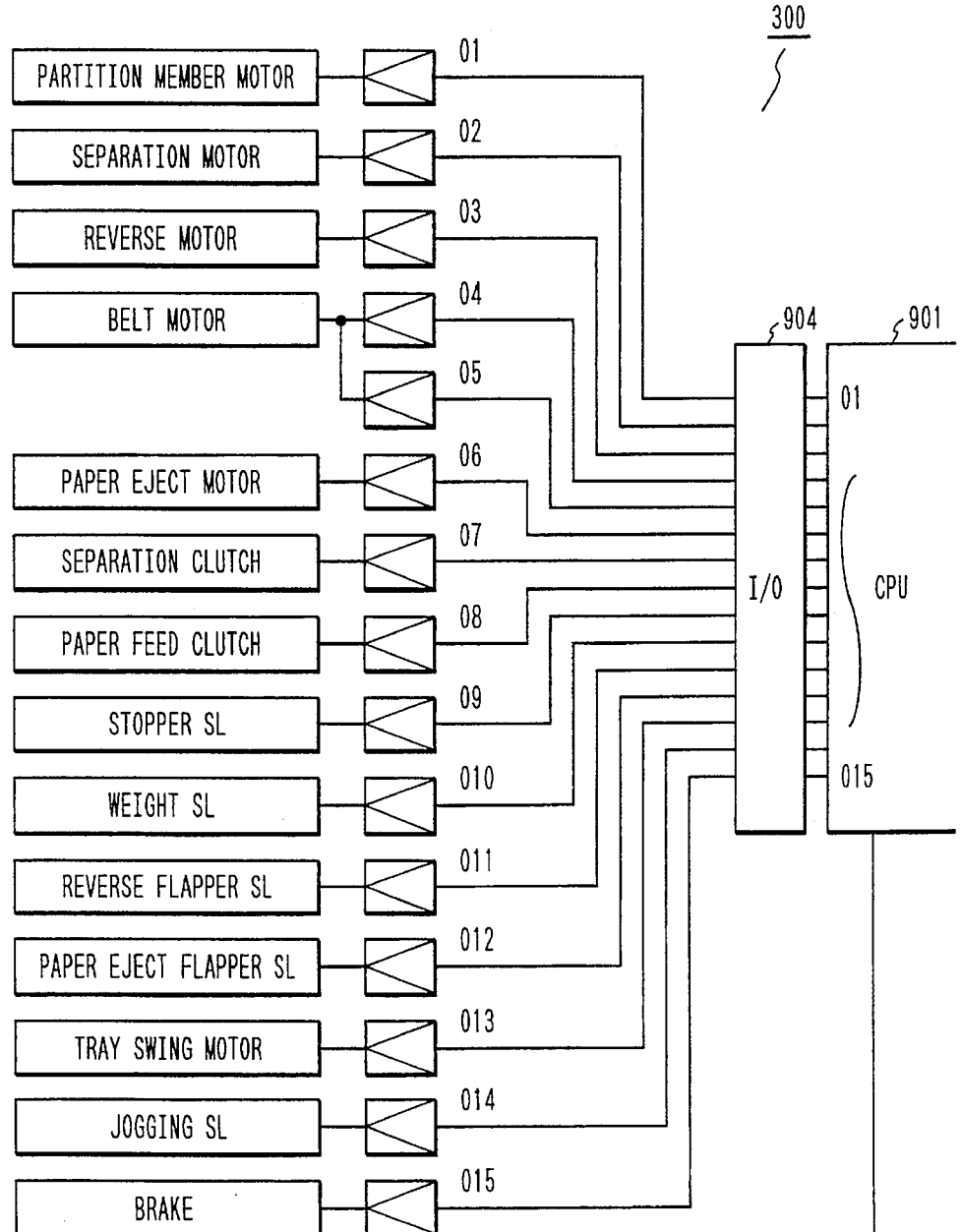

SHEET BINDING APPARATUS CAPABLE OF PERFORMING TWO KINDS OF BINDING PROCESSES

BACKGROUND OF THE INVENTION

1. Field of the Invention

The invention relates to a sheet binding apparatus which can perform two kinds of binding processes.

2. Related Background Art

Hitherto, there is a sorter which can staple sheets ejected from a copying machine or the like. Such a stapling function is convenient to distribute the copied sheets in a conference or the like. On the other hand, there has been proposed an apparatus which can sort a plurality of stacked sheets by stapling the sheets which were received and recorded by a facsimile apparatus or the like every communication.

In both of the stapling process which is executed by the foregoing sorter of the copying machine and the stapling process which is executed by a proposed facsimile apparatus, the sheets are stapled by a method of bending feet of a staple which was pierced through the sheets to the inside. According to such a bending method, since the sheets are firmly bound, its staple is hard to be released, so that it is convenient when the sheets are turned over in a conference or the like. However, after the sheets were sorted, the staple which was used to merely bind and sort the sheets becomes unnecessary and the user tries to remove such a staple. However, it is difficult to remove the staple.

Such an inconvenience occurs in a copying machine having functions of the copy, facsimile, and printer.

SUMMARY OF THE INVENTION

It is an object of the invention to provide a sheet binding apparatus which can solve the above problems.

Another object of the invention is to provide a sheet binding apparatus which can perform a binding process of a kind suitable for a mode of an image forming apparatus.

Still another object of the invention is to provide a sheet binding apparatus which can perform a method of bending feet of a staple to the inside and a method of bending feet of a staple to the outside.

The above and other objects and features of the present invention will become apparent from the following detailed description and the appended claims with reference to the accompanying drawings.

DETAILED DESCRIPTION OF THE PREFERRED EMBODIMENTS

Embodiment 1

Figure 1:
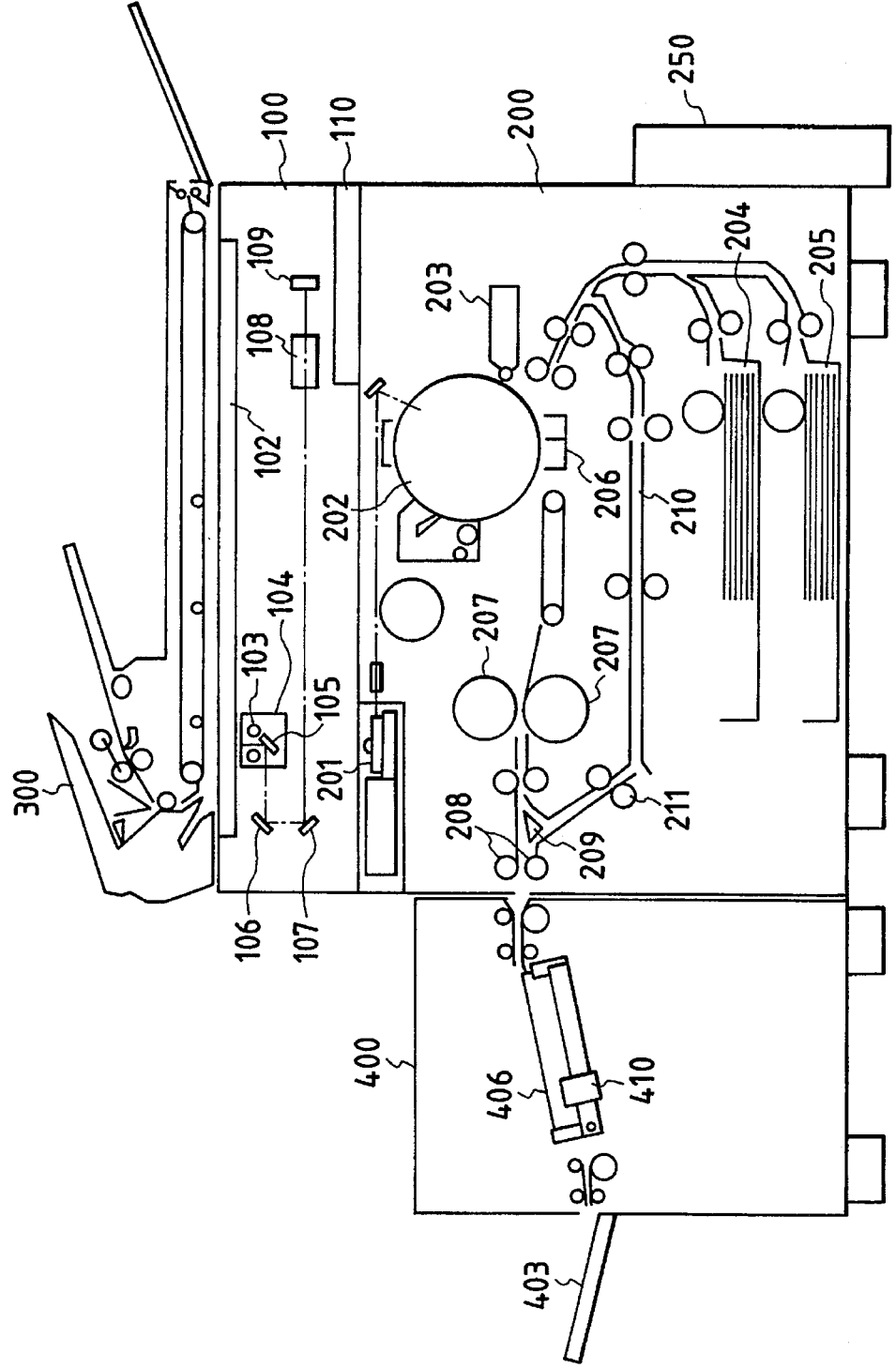
FIG. 1 is a cross sectional view showing a whole construction of an embodiment 1.

FIG. 1 is a cross sectional view showing a whole construction of an image forming apparatus of an embodiment 1. The image forming apparatus is constructed by a main body (reader unit 100, printer unit 200), a recyclic automatic document feeder (hereinafter, also simply referred to as an RDF) 300, and a sheet post-processing unit 400.

Each section will now be described in detail hereinbelow.

A. Main body (reader unit 100, printer unit 200)

In FIG. 1, reference numeral 100 denotes the image input device (hereinafter, referred to as a reader unit) for converting an image of an original to image data; 200 the image output device (hereinafter, referred to as a printer unit), having a plurality of kinds of recording paper cassettes, for outputting the image data as a visible image onto a recording paper by a print command; and 250 an external apparatus electrically connected to the reader unit 100. The external apparatus has various kinds of functions and includes a facsimile unit, a file unit, and an external apparatus connected to the file unit, a computer interface (I/F) unit for connecting to a computer, a formatter unit for obtaining a visible image from information from the computer, an image memory unit for storing information from the reader unit 100 or for temporarily storing the information sent from the computer, a core unit for controlling each of the above functions, and the like.

Constructions and operations of the reader unit 100 and printer unit 200 will now be described with reference to FIG. 1.

Figure 2:
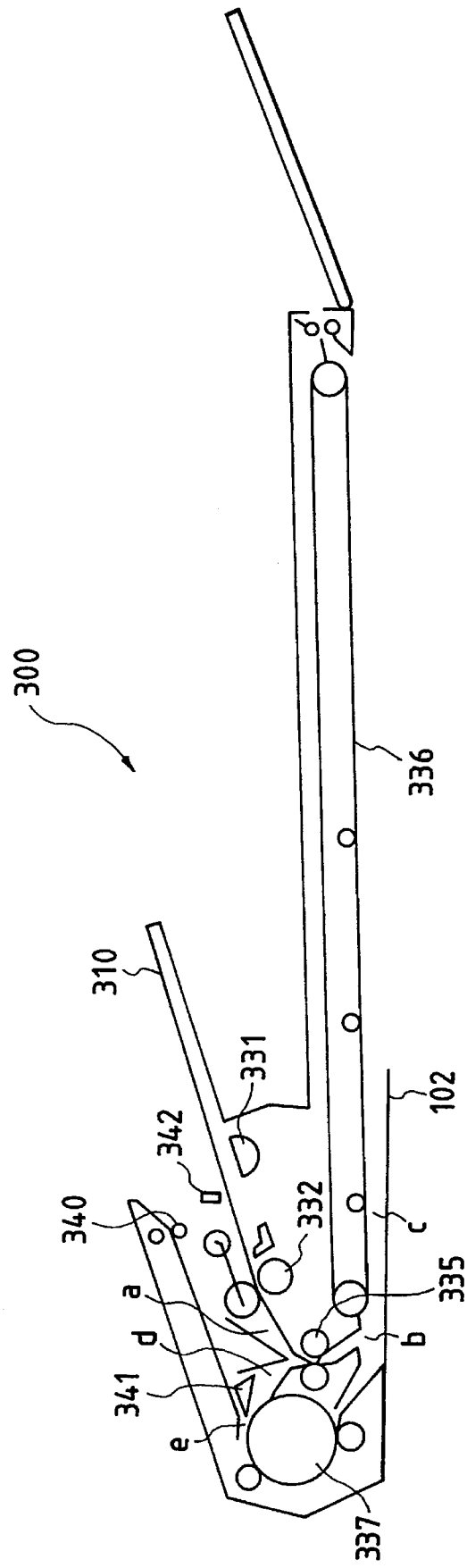
FIG. 2 is a cross sectional view showing a construction of an automatic document feeder.

Originals put on the RDF 300 shown in FIG. 2 are sequentially conveyed one by one onto a platen glass surface 102 (the operations will be described hereinafter). When the original is conveyed to a predetermined position of the glass surface 102, a lamp 103 of a scanner unit is lit on and a scanner unit 104 is moved, thereby exposing and scanning the original. A reflected light of the original is guided to a CCD image sensor unit (hereinafter, also simply referred to as a CCD) 109 by mirrors 105, 106, and 107 and a lens 108. The reflected light of the original irradiated to the CCD 109 is subjected to electric processes such as a photoelectric conversion and the like in the CCD and is also subjected to an ordinary digital process. After that, the resultant digital signals are inputted to the printer unit 200.

The image signal inputted to the printer unit 200 is converted to a photosignal modulated by an exposure control unit 201 and irradiates a photosensitive material 202. A latent image formed on the photosensitive material 202 by the irradiation light is developed by a developing unit 203. The sheet is conveyed by a sheet stacking unit 204 or 205 at a proper timing so as to match the sheet with the developed image. The developed image is transferred to the sheet by a transfer unit 206. The transferred image is fixed to the sheet by a fixing unit 207. After that, the sheet is ejected to the outside of the apparatus by a paper ejecting unit 208. The sheet ejected out from the paper ejecting unit 208 is subjected to a process such as a binding process or the like by the sheet post-processing apparatus 400 in accordance with an operation mode which has previously been designated.

A sheet on which an image which had been facsimile received was recorded is once guided to a roller 211 by a flapper 209. After that, the roller 211 is reversely rotated, thereby ejecting the sheet from the roller 208 to the outside. Namely, in case of the facsimile receiving mode, the recording paper is ejected out in a face-down state.

Subsequently, a method of outputting images to be sequentially read to both sides of one sheet will now be described.

After the sheet on which the image had been fixed by the fixing unit 207 was once conveyed to the paper ejecting unit 208, the conveying direction of the sheet is reversed and the sheet is conveyed to a re-feeding sheet stacking unit 210 through the conveying direction switching member 209. When the next original is prepared, in a manner similar to the foregoing process, the original image is read and the sheet is fed by the re-feeding sheet stacking unit 210. Two original images can be copied to the front and back surfaces of the sheet.

B. Recyclic automatic document feeder (RDF) 300

As shown in detail in FIG. 2, a stacking tray 310 to set an original bundle is provided for the RDF 300.

Feeding means constructing one portion of the original feeding means is provided for the stacking tray 310. The feeding means is constructed by: a semilunar roller 331; a separation convey roller 332; a separation motor SPRMTR (not shown); a registration roller 335; a whole surface belt 336; a belt motor BELTMTR (not shown); a large convey roller 337; a feed motor FEEDMTR (not shown); an ejection roller 340; a flapper 341; a recycle lever 342; a paper feed sensor ENTS (not shown); a reverse sensor TRNS (not shown); a paper eject sensor EJTS (not shown); and the like.

The half-moon roller 331 and separation convey roller 332 are rotated by the separation motor SPRMT, thereby separating the originals in the lowest portion of the original bundle stacked on the stacking tray 310 one by one.

The registration roller 335 and whole surface belt 336 are rotated by the belt motor BELTMTR and conveys the original separated by the separation convey roller 332 to the exposing position (sheet path c) on the platen glass surface 102 through sheet paths (a) and (b). After completion of the exposure of the original, the large convey roller 337 is rotated by the feed motor FEEDMTR, thereby conveying the original put on the platen glass surface 102 to a sheet path (e) from the sheet path (c). The original conveyed to the sheet path (e) is returned onto the original bundle on the stacking tray 310 by the ejection roller 340.

The recycle lever 342 detects one circulation of the original. When starting the original feed, the recycle lever 342 is put onto the upper portion of the original bundle and the originals are sequentially fed. When the rear edge of the last original passes through the recycle lever 342, it is detected that the recycle lever 342 dropped due to the self weight, thereby detecting one circulation of the original.

In case of the two-sided original, the original is fed from the sheet path (c) to the large convey roller 337, and the front edge of the original is guided to a sheet path (d) by the flapper 341. Subsequently, the original is allowed to pass through the sheet path (b) by the registration roller 335. After that, the original is conveyed onto the platen glass surface 102 by the whole surface belt 336 and is stopped, thereby reversing the original. Namely, the original is reversed by a path along the sheet paths (c) - (d) - (b).

It is also possible to construct in a manner such that the originals of the original bundle are allowed to pass through the sheet paths (a) - (b) - (c) - (d) (e) one by one without executing the original exposing operation and is conveyed until one circulation is detected by the recycle lever 342, thereby automatically counting the number of originals.

C. Sheet post-processing apparatus 400

The sheet post-processing apparatus 400 will now be described with reference to FIGS. 3 and 4. In the diagram, the sheet post-processing apparatus 400 is constructed by a machine body 402 and an ejection tray 403. The machine body 402 has a pair of inlet rollers 405 in close vicinity to an inlet 404. A temporary storage tray unit 406 is provided next to the inlet roller pair 405 and, further, a pair of ejection rollers 407 for conveying the sheet from the temporary storage tray unit 406 to the ejection tray 403 are arranged.

The inlet roller pair 405 and ejection roller pair 407 are driven by a convey motor (not shown) and an ejection motor (not shown), respectively.

The temporary storage tray unit 406 is constructed by a temporary storage tray unit 408, a movable stopper 409, a binding processing unit 410, a sheet bundle extruding unit 411, and a sheet bundle pressing unit 412. The binding processing unit 410 and sheet bundle pressing unit 412 are provided on the front side and rear side so that a binding process can be executed from both sides of the sheet, respectively.

The movable stopper 409 rotates around an axis 409a as a rotational center so as to be vertical or horizontal for the temporary storage tray unit 408. When the movable stopper 409 is set to a vertical state, it functions as a stopper of the sheet bundle so that the sheets can be held in the temporary storage tray unit 408. When the movable stopper 409 is set to a horizontal state, it functions as an extension of the temporary storage tray unit 408 and operates as a conveying path when the sheet bundle is ejected out to the ejection tray 403. The movable stopper 409 is driven by a stepping motor (not shown).

Figure 4:
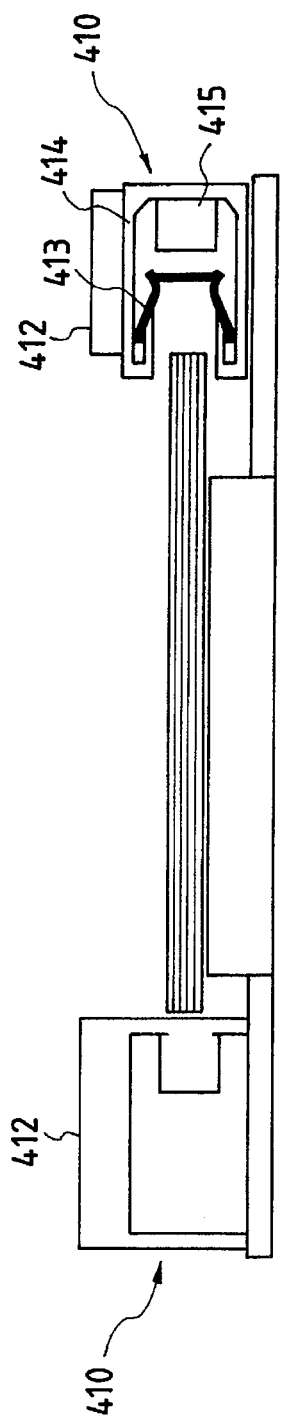
FIG. 4 is an explanatory diagram of a temporary storage tray.

As shown in FIG. 4, the binding processing unit 410 is constructed by a clip 413, a clip attaching unit 414, a clip extruding unit 415. The clip attaching unit 414 is set into a state in which the clip 413 is opened. The clip attaching unit 414 and clip extruding unit 415 extrude the clip 413 until the inner surface of the clip 413 is come into contact with the sheet bundle. From this position, only the clip attaching unit 414 is moved in the direction of the sheet bundle, so that the clip 413 is removed from the clip attaching unit 414 and binds the sheet bundle by a tension of the clip such that the widened clip 413 intends to return to the original state. After that the clip attaching unit 414 and clip extruding unit 415 are controlled by a motor (not shown) so as to be returned to the original positions.

Figure 3:
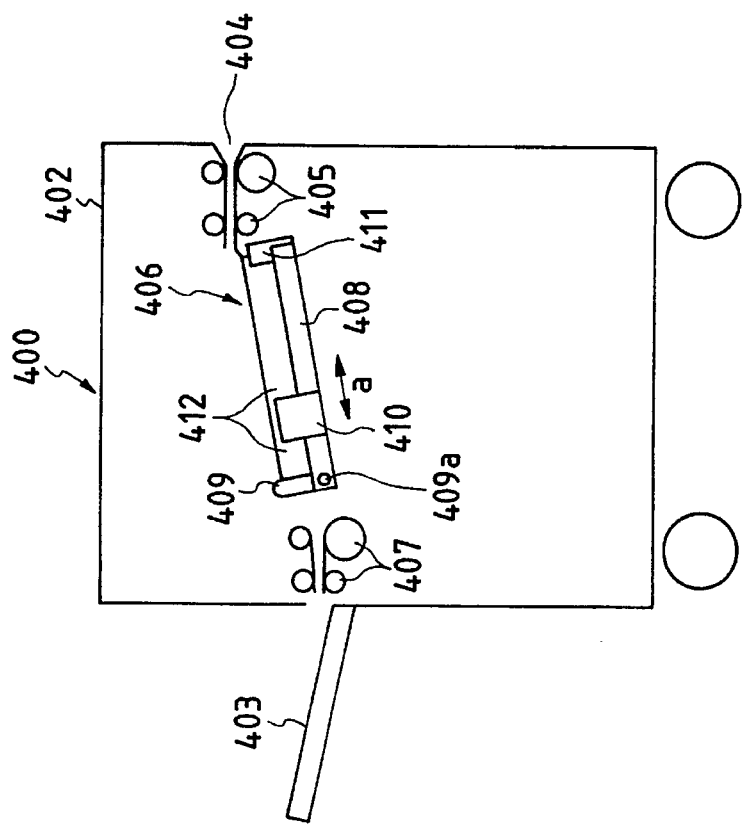
FIG. 3 is a cross sectional view showing a construction of a sheet post-processing apparatus.

The binding processing unit 410 is driven by a motor (not shown) and can move in the direction of (a) in FIG. 3 so that the binding position of the sheet can be freely changed.

The sheet bundle extruding unit 411 is controlled by a motor (not shown) so as to extrude the sheet bundle to the ejection roller pair 407 in a manner such that the sheet bundle can be ejected out to the ejection tray 403 in a state in which the movable stopper 409 is parallel with the temporary storage tray unit 408.

The sheet bundle pressing unit 412 functions to press the side surface of the sheet bundle so as not to cause a deviation of the sheet bundle when the sheets are bundled with a clip.

D. Operation panel 500

Figure 5:
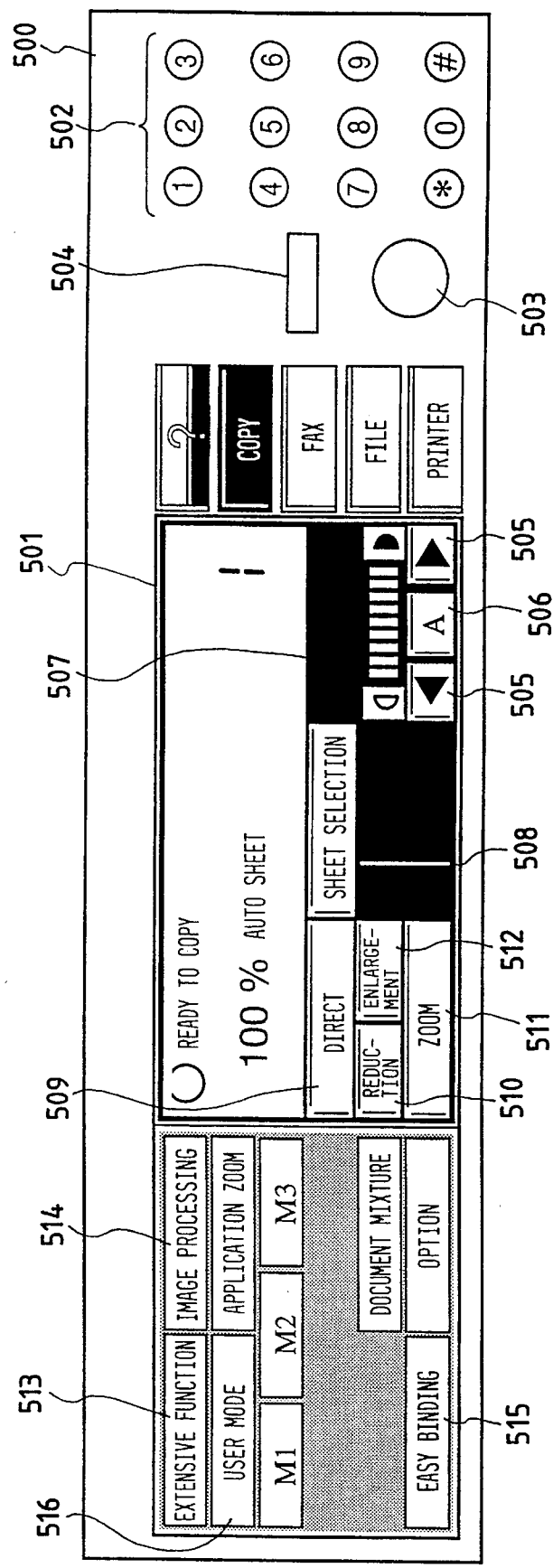
FIG. 5 is a diagram showing an arrangement of an operation panel.

FIG. 5 shows an example of an arrangement of an operation panel 500 provided for the main body 100. The operation panel 500 has keys and an LCD display 501 of the touch panel type.

Reference numeral 503 denotes a copy start key which is pressed to start the copying operation; and 504 indicates a clear/stop key. When the clear/stop key 504 is depressed in a standby mode, it functions as a clear key. The clear/stop key 504 functions as a stop key during the copying and recording operation. The clear key 504 is depressed when cancelling the set number of copies. Reference numeral 502 denotes a ten-key which is pressed to set the number of copies; 505 a copy density key which is depressed when manually adjusting a copy density; and 506 an AE key which is pressed when the copy density is automatically adjusted in accordance with a density of original or when the AE (automatic density adjustment) is cancelled and the density adjusting mode is switched to the manual mode. Reference numeral 508 denotes a cassette selection key which is pressed when selecting either one of an upper stage cassette, a middle stage cassette, and a lower stage paper deck. When originals are put in the RDF 300, an APS (automatic paper selection) can be selected by the key 508. When the APS is selected, the cassette of the sheets of the same size as that of the original is automatically selected. Reference numeral 509 denotes a direct key which is pressed when copying at an equal magnification (original size); 511 a zoom key which is pressed when designating an arbitrary magnification in a range from 64 to 142%; and 510 and 512 regular size zoom keys which are pressed when designating a reduction or enlargement of a regular size.

Reference numeral 515 denotes a key to select an operation mode of the sheet post-processing apparatus 400. The binding operation and the binding position can be set or reset by the key 515.

Further, various enlarging functions and image processes can be set by keys 513 and 514. For example, a two-sided mode, a binding margin setting mode, a photograph mode, a multiplexing process, a serial page copy mode, a 2-in-1 mode, etc. can be set.

Reference numeral 501 denotes the LCD display to display various messages of information regarding the copy operation.

Explanation of whole block diagram

Figure 6:
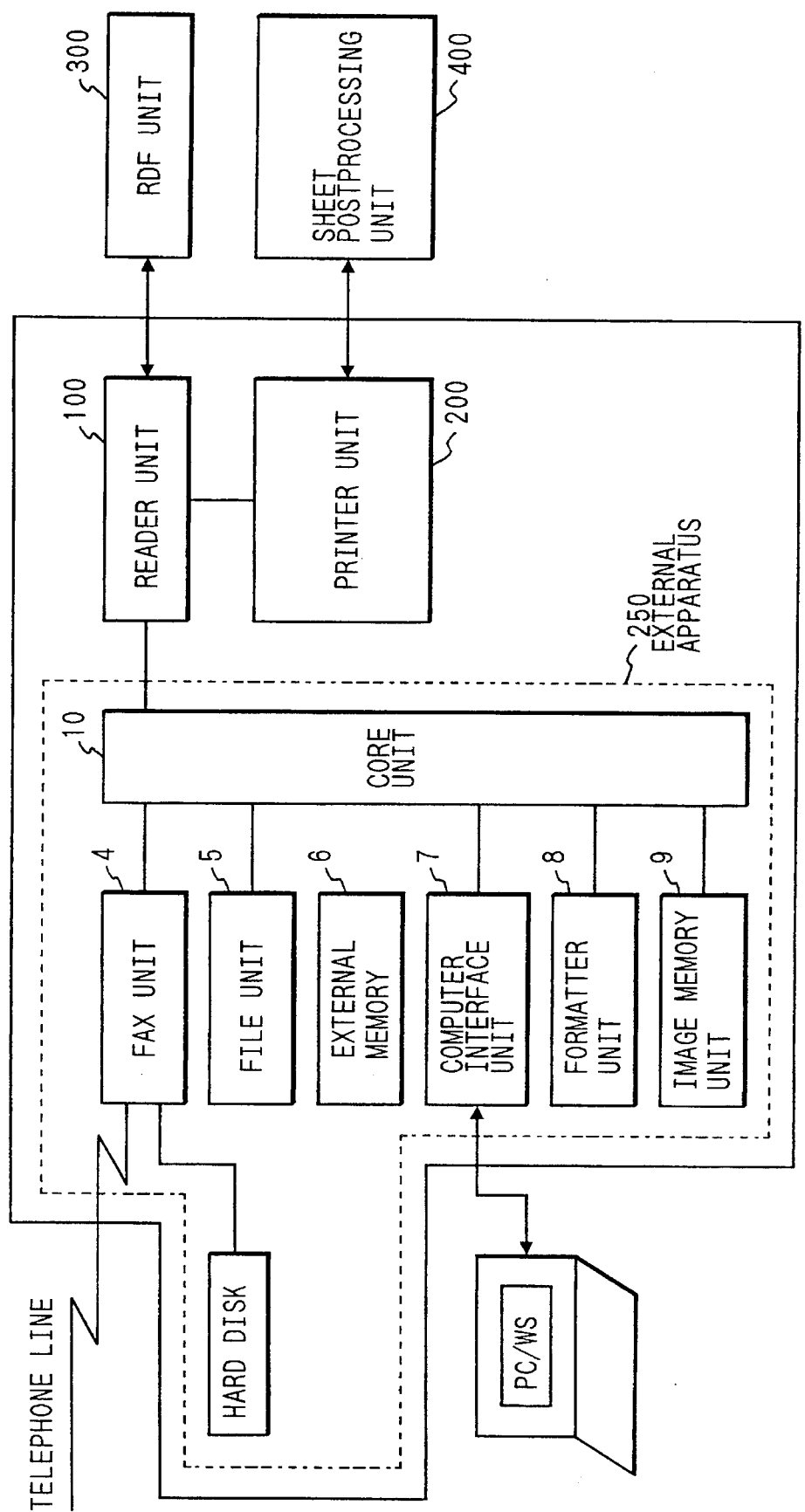
FIG. 6 is a block diagram of an embodiment 1.

FIG. 6 is a block diagram showing a whole construction of the image forming apparatus of the embodiment. Control units of the reader unit 100, printer unit 200, external apparatus 250, RDF (recycle automatic document feeder) 300, and sheet post-processing units 400 are shown. The control unit transmits or receives data by a bus or serial communication or the like and performs synchronization. Since those control units are main units of the reader unit, printer unit, and the like, they are simply abbreviated to the reader unit 100, printer unit 200, and the like. Data which is transmitted from the main body to the RDF 300 includes a paper feed signal to expedite the paper feed of the originals stacked in the RDF 300, an ejection signal to expedite the ejection of the originals put on the platen glass surface, and a paper feed/ejection mode to decide a format of the feed or ejection of the originals. Data which is transmitted from the main body to the sheet post-processing apparatus 250 includes an operation mode, a binding processing signal, a sheet size, a timing signal, and the like. When the operation is being executed, data indicative of the operation using which function of the external apparatus 250 is transmitted from the reader unit 100 and printer unit 200 to the RDF 300 and sheet post-processing unit 400 by using the communication.

The external apparatus 250 is connected to the reader unit 100 via a cable and executes a control of a signal and a control of each function in a core unit 10 in the external apparatus 250. The external apparatus 250 has: a facsimile unit 4 to execute facsimile transmission or reception; a file unit 5 to convert various kinds of original information to electric signals and for preserving to a magnetooptic disk; a computer interface (I/F) unit 7 to interface with a formatter unit 8 for developing code information from a computer to image information and the computer; an image memory unit 9 to store information from the reader unit 100 and for temporarily storing information sent from the computer; and the core unit 10 to control each of the above functions.

E. Reader unit 100

Figure 7:
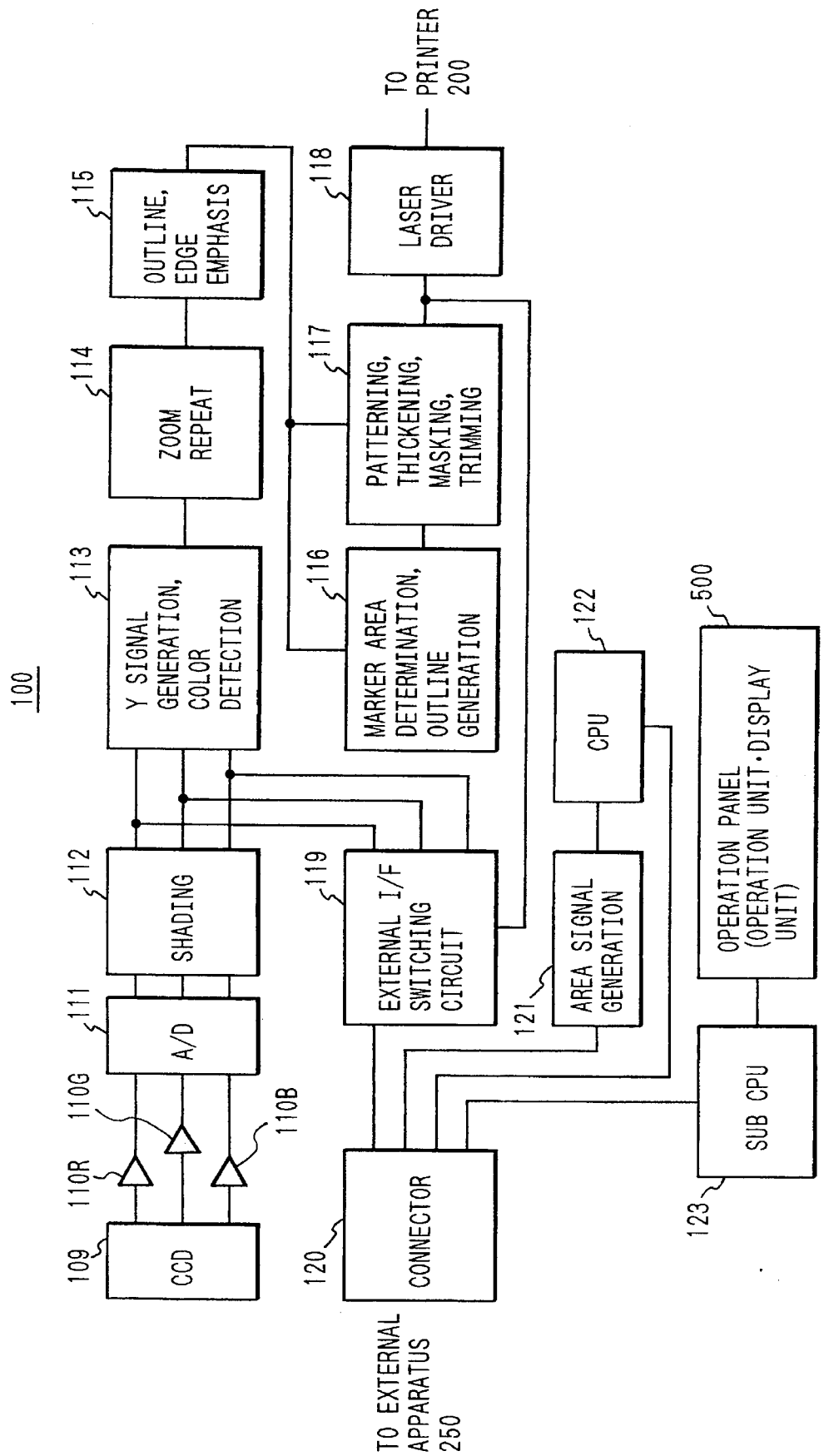
FIG. 7 is a block diagram of a reader unit.

FIG. 7 is a circuit block diagram showing a signal processing construction of the reader unit 100. Construction and operation of the reader unit 100 will now be described hereinbelow.

The reflected light of the original which was irradiated to the scanner unit 104 is photoelectrically converted to electric signals of the colors of red (R), green (G), and blue (B) by the CCD 109. The color information from the CCD 109 is respectively amplified by next amplifiers 110R, 110G, and 110B in accordance with an input signal level of an A/D converter 111. Output signals from the A/D converter 111 are supplied to a shading circuit 112, by which a light distribution variation of the lamp 103 and a sensitivity variation of the CCD 109 are corrected. Signals from the shading circuit 112 are inputted to a Y signal generation • color detection circuit 113 and an external I/F switching circuit 119.

The Y signal generation • color detection circuit 113 executes an arithmetic operation based on the following expression to the signals from the shading circuit 112, thereby obtaining a Y (luminance) signal.

$$Y = 0.3R + 0.6G + 0.1B$$

Further, the reader unit has a color detection circuit for separating to seven colors from the signals of R, G, and B and for outputting signals for those colors. Output signals from the Y signal generation • color detection circuit 113 are supplied to a zoom • repeat circuit 114. A zooming operation in the sub scanning direction is executed by the scanner unit 104 in accordance with a scanning speed. A zooming operation in the main scanning direction is performed by the zoom • repeat circuit 114. A plurality of same images can be outputted by the zoom • repeat circuit 114. An outline • edge emphasizing circuit 115 obtains edge emphasis and outline information by emphasizing a high frequency component of the signal from the zoom • repeat circuit 114. A signal from the outline • edge emphasizing circuit 115 is supplied to a marker area judgment • outline generation circuit 116 and to a patterning • thickening • masking • trimming circuit 117.

The marker area judgment • outline generation circuit 116 reads a portion written by a marker pen of the designated color on the original and generates outline information of the marker. The next patterning • thickening • masking • trimming circuit 117 executes a thickening, masking, or trimming process from the outline information and also executes a patterning process by the color detection signal from the Y signal generation • color detection circuit 113.

An output signal from the patterning • thickening • masking • trimming circuit 117 is supplied to a laser driver 118 and is converted to a signal to laser drive the signal which was subjected to various processes. An output signal of the laser driver 118 is supplied to the printer unit 200 and an image is formed as a visible image.

The external I/F switching circuit 119 for interfacing with the external apparatus will now be described.

In case of outputting the image information from the reader unit 100 to the external apparatus 250, the external I/F switching circuit 119 outputs the image information from the patterning • thickening • masking • trimming circuit 117 to a connector 120. In case of inputting the image information from the external apparatus 250 to the reader unit 100, the external I/F switching circuit 119 supplies the image information from the connector 120 to the Y signal generation • color detection circuit 113.

The foregoing various image processes are executed by an instruction from a CPU 122. An area signal generation circuit 121 generates various kinds of timing signals which are necessary for the image processes mentioned above on the basis of values set by the CPU 122. Further, a communication with the external apparatus 250 is executed by using the communicating function built in the CPU 122. An SUB • CPU 123 controls the operation panel 500 and executes a communication with the external apparatus 250 by using a communicating function built in the SUB • CPU 123.

F. Core unit 10

Figure 8:
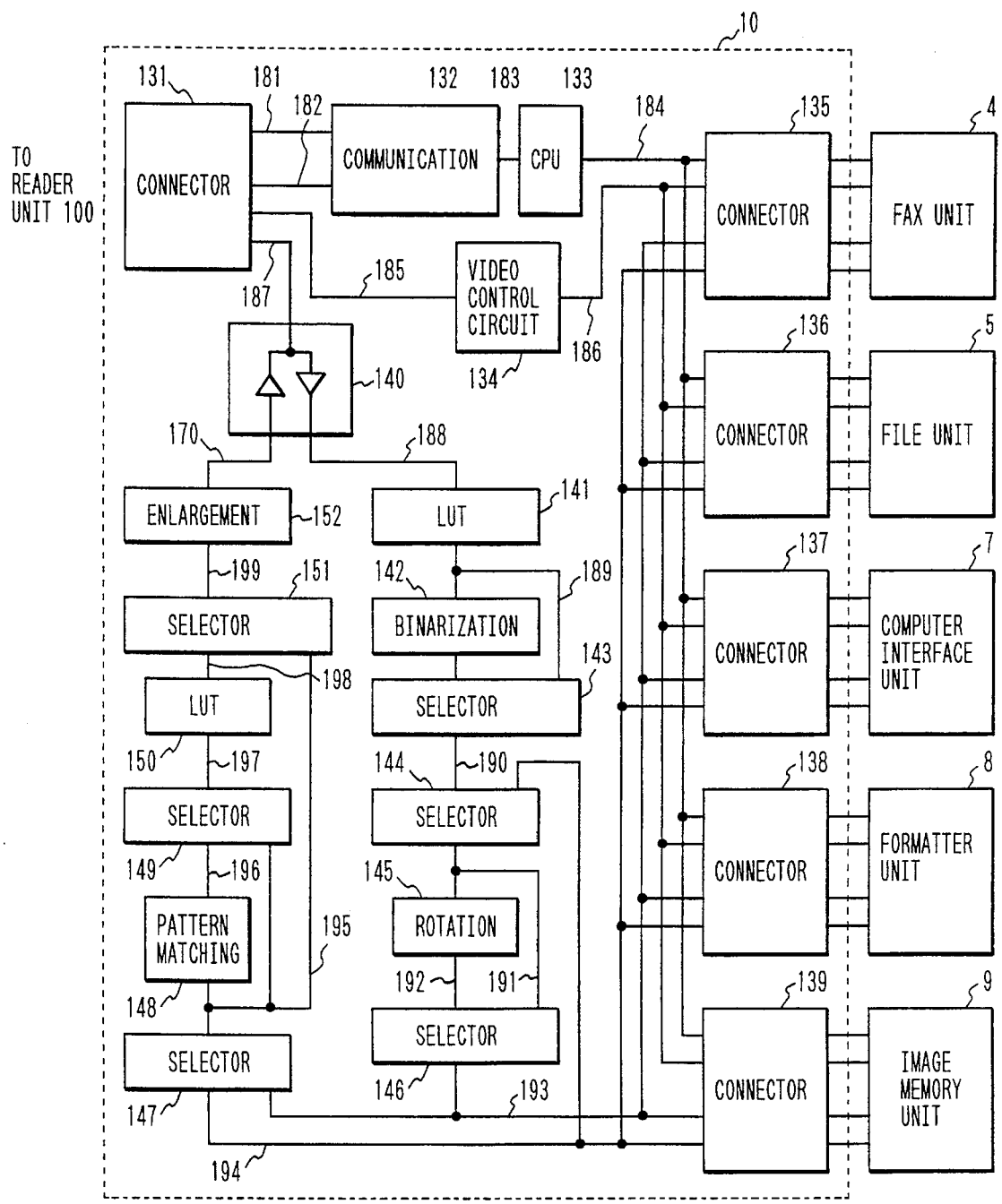
FIG. 8 is a block diagram of a core unit.

FIG. 8 is a block diagram showing a detailed construction of the core unit 10 mentioned above.

A connector 131 of the core unit 10 is connected to the connector 120 of the reader unit 100 by a cable. Four kinds of signals are inputted and outputted to/from the connector 131. A signal 187 is a multivalue video signal of eight bits. A signal 185 is a control signal to control the video signal. A signal 181 is a signal to communicate with the CPU 122 in the reader unit 100. A signal 182 is a signal to communicate with the SUB • CPU 123 in the reader unit 100. The signals 181 and 182 are subjected to a communication protocol process by an IC 132 for communication and transmit communication information to a CPU 133 through a CPU bus 183.

The signal 187 corresponds to a bidirectional video signal line and can receive the information from the reader unit 100 by the core unit 10 or can output the information from the core unit 10 to the reader unit 100.

The signal 187 is connected to a buffer 140, by which it is separated to one-way signals 188 and 170 from the bidirectional signal. The signal 188 is the video signal of multivalues of eight bits from the reader unit 100 and is supplied to an LUT 141 at the next stage. In the LUT 141, the image information from the reader unit 100 is converted to a desired value by a look-up table. An output signal 189 from the LUT 141 is supplied to a binarization circuit 142 or a selector 143. The binarization circuit 142 has a simple binarizing function for binarizing the multivalue signal 189 by a fixed slice level, a binarizing function for binarizing by a fluctuation slice level in which a slice level fluctuates from the values of the pixels around a target pixel, and a binarizing function by an error diffusing method. The binarized information is converted to the multivalue signal of 00H in case of 0 and FFH in case of 1 and is inputted to the selector 143 at the next stage. The selector 143 selects either one of a signal from the LUT 141 and an output signal from the binarization circuit 142. An output signal 190 from the selector 143 is inputted to a selector 144. In accordance with an instruction from the CPU 133, the selector 144 selects either one of a signal 194 obtained by inputting the output video signals from the fax unit 4, file unit 5, computer I/F unit 7, formatter unit 8, and image memory unit 9 connectors 135, 136, 137, 138, and 139 to the core unit 10 and the output signal 190 of the selector 143. An output signal 191 of the selector 144 is inputted to a rotation circuit 145 or a selector 146. The rotation circuit 145 has a function to rotate the inputted image signal by +90°, −90°, or +180°. After the information outputted from the reader unit 100 was converted to the binary signal by the binarization circuit 142, the rotation circuit 145 stores as information from the reader unit 100 into the rotation circuit 145. The rotation circuit 145 rotates the stored information and reads out by an instruction from the CPU 133. The selector 146 selects either one of an output signal 192 of the rotation circuit 145 and the input signal 191 of the rotation circuit 145. The selector 146 outputs the selected signal as an output signal 193 to the connector 135 with the fax unit 4, the connector 136 with the file unit 5, the connector 137 with the computer I/F unit 7, the connector 138 with the formatter unit 8, the connector 139 with the image memory unit 9, and a selector 147.

A line of the signal 193 is a one-way video bus of eight bits of the synchronizing type for transferring the image information from the core unit 10 to the fax unit 4, file unit 5, computer I/F unit 7, formatter unit 8, and image memory unit 9. A line of the signal 194 is a one-way video bus of eight bits of the synchronizing type for transmitting the image information from the fax unit 4, file unit 5, computer I/F unit 7, formatter unit 8, and image memory unit 9. A video control circuit 134 executes a control of the synchronizing type bus of the signals 193 and 194 by an output signal 186 from the video control circuit 134. A signal 184 is connected to the connectors 135 to 139, respectively. A line of the signal 184 is a bidirectional CPU bus of 16 bits and transmits or receives data and commands by the asynchronizing type. The information transfer between the fax unit 4, file unit 5, computer I/F unit 7, formatter unit 8, and image memory unit 9 and the core unit 10 can be performed by the two video buses 193 and 194 and the CPU bus 184.

The signal 194 from the fax unit 4, file unit 5, computer I/F unit 7, formatter unit 8, and image memory unit 9 is supplied to the selectors 144 and 147. The selector 144 inputs the signal 194 to the rotation circuit 145 at the next stage by an instruction from the CPU 133.

The selector 147 selects either one of the signals 193 and 194 by the instruction of the CPU 133. An output signal 195 of the selector 147 are supplied to a pattern matching circuit 148 and a selector 149. The pattern matching circuit 148 matches the input signal 195 with a predetermined pattern. When those patterns coincide, a predetermined multi-value signal is outputted to a signal line 196. When those patterns don't coincide as a result of the pattern matching, the input signal 195 is outputted to the signal 196.

The selector 149 selects either one of the signals 195 and 196 by an instruction of the CPU 133. An output signal 197 of the selector 149 is inputted to an LUT 150 at the next stage.

When outputting the image information to the printer unit 200, the LUT 150 converts the input signal 197 in accordance with characteristics of the printer.

A selector 151 selects either one of an output signal 198 of the LUT 150 and the signal 195 by an instruction of the CPU 133. An output signal of the selector 151 is inputted to an enlargement circuit 152 at the next stage.

The enlargement circuit 152 can independently set an enlargement magnification with respect to the X and Y directions by an instruction from the CPU 133. As an enlarging method, a primary linear interpolating method is used. The output signal 170 of the enlargement circuit 152 is inputted to the buffer 140.

The signal 170 inputted to the buffer 140 becomes the bidirectional signal 187 by an instruction of the CPU 133 and is sent to the printer unit 200 through the connector 131 and a corresponding image is printed out.

A flow of signals between the core unit 10 and each unit will now be described hereinbelow.

a. Operation of the core unit 10 by the information of the fax unit 4

The case of outputting information to the fax unit 4 will now be described. The CPU 133 communicates with the CPU 122 of the reader unit 100 through the communication IC 132 and generates an original scan command. Since the original is scanned by the scanner unit 104 by the original scan command, the reader unit 100 generates the image information to the connector 120. The reader unit 100 is connected to the external apparatus 250 by a cable. The information from the reader unit 100 is inputted to the connector 131 of the core unit 10. The image information supplied to the connector 131 is inputted to the buffer 140 through the multivalue signal line 187 of 8 bits. The buffer 140 supplies the bidirectional signal 187 as a one-way signal to the LUT 141 through the signal line 188 by an instruction of the CPU. In the LUT 141, the image information from the reader unit 100 is converted to a desired value by using the look-up table. For example, a background of the original can be omitted. The output signal 189 of the LUT 141 is inputted to the binarization circuit 142 at the next stage. The binarization circuit 142 converts the 8-bit multivalue signal 189 to the binary signal. The binarization circuit 142 converts the signal 189 to a signal of multivalues of two values. Namely, when the binary signal is equal to 0, the value is set to 00H. When the binary signal is equal to 1, the value is set to FFH. An output signal of the binarization circuit 142 is supplied to the rotation circuit 145 or selector 146 through the selectors 143 and 144. The output signal 192 of the rotation circuit 145 is also inputted to the selector 146. The selector 146 selects either one of the signals 191 and 192. The selection of the signal is decided by communicating with the fax unit 4 through the CPU bus 184 by the CPU 133. The output signal 193 from the selector 146 is sent to the fax unit 4 through the connector 135.

The case of receiving the information from the fax unit 4 will now be described.

The image information from the fax unit 4 is transmitted to the signal line 194 through the connector 135. The signal 194 is inputted to the selectors 144 and 147. In case of rotating the image upon fax reception and outputting to the printer unit 200 by an instruction of the CPU 133, the signal 194 inputted to the selector 144 is rotated by the rotation circuit 145. The output signal 192 from the rotation circuit 145 is inputted to the pattern matching circuit 148 through the selectors 146 and 147.

In case of directly outputting the image upon fax reception to the printer unit 200 by an instruction of the CPU 133, the signal 194 inputted to the selector 147 is supplied to the pattern matching circuit 148.

The pattern matching circuit 148 has a function to smooth a zig-zag outline of the image which was facsimile received. The pattern matched signal is supplied to the LUT 150 through the selector 149. To output the fax-received image to the printer unit 200 at a desired density, the table of the LUT 150 can be changed by the CPU 133. The output signal 198 of the LUT 150 is inputted to the enlargement circuit 152 through the selector 151. The enlargement circuit 152 executes an enlarging process to the multivalues of eight bits having two values (00H, FFH) by the primary linear interpolation method. The 8-bit multivalue signal having many values from the enlargement circuit 152 is sent to the reader unit 100 through the buffer 140 and connector 131. The reader unit 100 supplies the 8-bit multivalue signal to the external I/F switching circuit 119 through the connector 120. The external I/F switching circuit 119 supplies the signal from the fax unit 4 to the Y signal generation • color detection circuit 113. The output signal from the Y signal generation • color detection circuit 113 is processed as mentioned above. After that, the processed signal is outputted to the printer unit 200 and an image is formed on the recording paper.

b. Operation of the core unit 10 by the information of the file unit 5

The case of outputting the information to the file unit 5 will now be described.

The CPU 133 communicates with the CPU 122 of the reader unit 100 through the communication IC 132 and generates an original scan command. Since the original is scanned by the scanner unit 104 by the original scan command, the reader unit 100 generates the image information to the connector 120. The reader unit 100 is connected to a control unit of the external apparatus by a cable. The information from the reader unit 100 is inputted to the connector 131 of the core unit 10. The image information inputted to the connector 131 becomes the one-way signal 188 by the buffer 140. The signal 188 as a multivalue 8-bit signal is converted to a desired signal by the LUT 141. The output signal 189 of the LUT 141 is inputted to the connector 136 through the selectors 143, 144, and 146.

Namely, the output signal 189 is transferred as an 8-bit multivalue signal to the file unit 5 without using the functions of the binarization circuit 142 and rotation circuit 145. In case of filing the binary signal by the communication with the file unit 5 through the CPU bus 184 of the CPU 133, the functions of the binarization circuit 142 and rotation circuit 145 are used. Since the binarizing process and rotating process are similar to those in case of the foregoing facsimile apparatus, their descriptions are omitted.

The case of receiving the information from the file unit 5 will now be described.

The image information from the file unit 5 is supplied as a signal 194 to the selector 144 or 147 through the connector 136. In case of filing the 8-bit multivalues, it can be inputted to the selector 147. In case of filing the binary values, it can be inputted to the selector 144 or 147. In case of filing the binary values, since processes are similar to those of the facsimile apparatus, their descriptions are omitted.

In case of filing the multivalues, the output signal 195 from the selector 147 is inputted to the LUT 150 through the selector 149. In the LUT 150, a look-up table is formed by an instruction of the CPU 133 in accordance with a desired print density. The output signal 198 from the LUT 150 is inputted to the enlargement circuit 152 through the selector 151. The 8-bit multivalue signal 170 which was enlarged at a desired enlargement magnification by the enlargement circuit 152 is sent to the reader unit 100 through the buffer 140 and connector 131. The information of the file unit sent to the reader unit 100 is outputted to the printer unit 200 and an image is formed on the recording paper in a manner similar to the case of the foregoing facsimile apparatus.

c. Operation of the core unit 10 by the information of the computer I/F unit 7

The computer I/F unit 7 interfaces with the computer connected to the external apparatus 250. The computer I/F unit 7 has a plurality of interfaces for communicating with the SCSI, RS232C, and centronics system. The computer I/F unit 7 has the foregoing three kinds of interfaces. The information from each interface is sent to the CPU 133 through the connector 137 and data bus 184. The CPU 133 executes various kinds of controls in accordance with the contents sent.

d. Operation of the core unit 10 by the information of the formatter unit 8

The formatter unit 8 has a function to develop the command data such as a document file or the like sent from the computer I/F unit 7 mentioned above to the image data. When it is judged that the data sent from the computer I/F unit 7 through the data bus 184 is the data regarding the formatter unit 8, the CPU 133 transfers the data to the formatter unit 8 through the connector 138. The formatter unit 8 develops the transferred data into the memory as an image such as characters, figure, or the like having a meaning.

A procedure for receiving the information from the formatter unit 8 and forming an image on the recording paper will now be described. The image information from the formatter unit 8 is transmitted as a multivalue signal having two values (00H, FFH) to the signal line 194 through the connector 138. The signal 194 is inputted to the selectors 144 and 147. The selectors 144 and 147 are controlled by an instruction of the CPU 133. Since the subsequent processes are similar to those described in the facsimile apparatus, their descriptions are omitted here.

e. Operation of the core unit 10 by the information of the image memory unit 9

The case of outputting the information to the image memory unit 9 will now be described.

The CPU 133 communicates with the CPU 122 of the reader unit 100 through the communication IC 132 and generates the original scan command. By scanning the original by the scanner unit 104 by the original scan command, the reader unit 100 outputs the image information to the connector 120. The reader unit 100 is connected to the external apparatus 250 by a cable. The information from the reader unit 100 is inputted to the connector 131 of the core unit 10. The image information inputted to the connector 131 is sent to the LUT 141 through the multivalue 8-bit signal line 187 and buffer 140. The output signal 189 of the LUT 141 transfers the multivalue image information to the image memory unit 9 through the selectors 143, 144, and 146 and connector 139. The image information stored in the image memory unit 9 is sent to the CPU 133 through the CPU bus 184 of the connector 139. The CPU 133 transfers the data sent from the image memory unit 9 to the computer I/F unit 7. The computer I/F unit 7 transfers the data to the computer by a desired one of the three kinds of interfaces (SCSI, RS232C, centronics).

The case of receiving the information from the image memory unit 9 will now be described.

First, the image information is sent to the core unit 10 from the computer through the computer I/F unit 7. When it is judged that the data sent from the computer I/F unit 7 through the CPU bus 184 is the data regarding the image memory unit 9, the CPU 133 of the core unit 10 transfers the data to the image memory unit 9 through the connector 139. Subsequently, the image memory unit 9 transmits the 8-bit multivalue signal 194 to the selectors 144 and 147 through the connector 139. The output signal from the selector 144 or 147 is outputted to the printer unit 200 and an image is formed onto the recording paper by an instruction of the CPU 133 in a manner similar to the case of the foregoing facsimile apparatus.

G. Control apparatus of the RDF 300

Figure 9B:
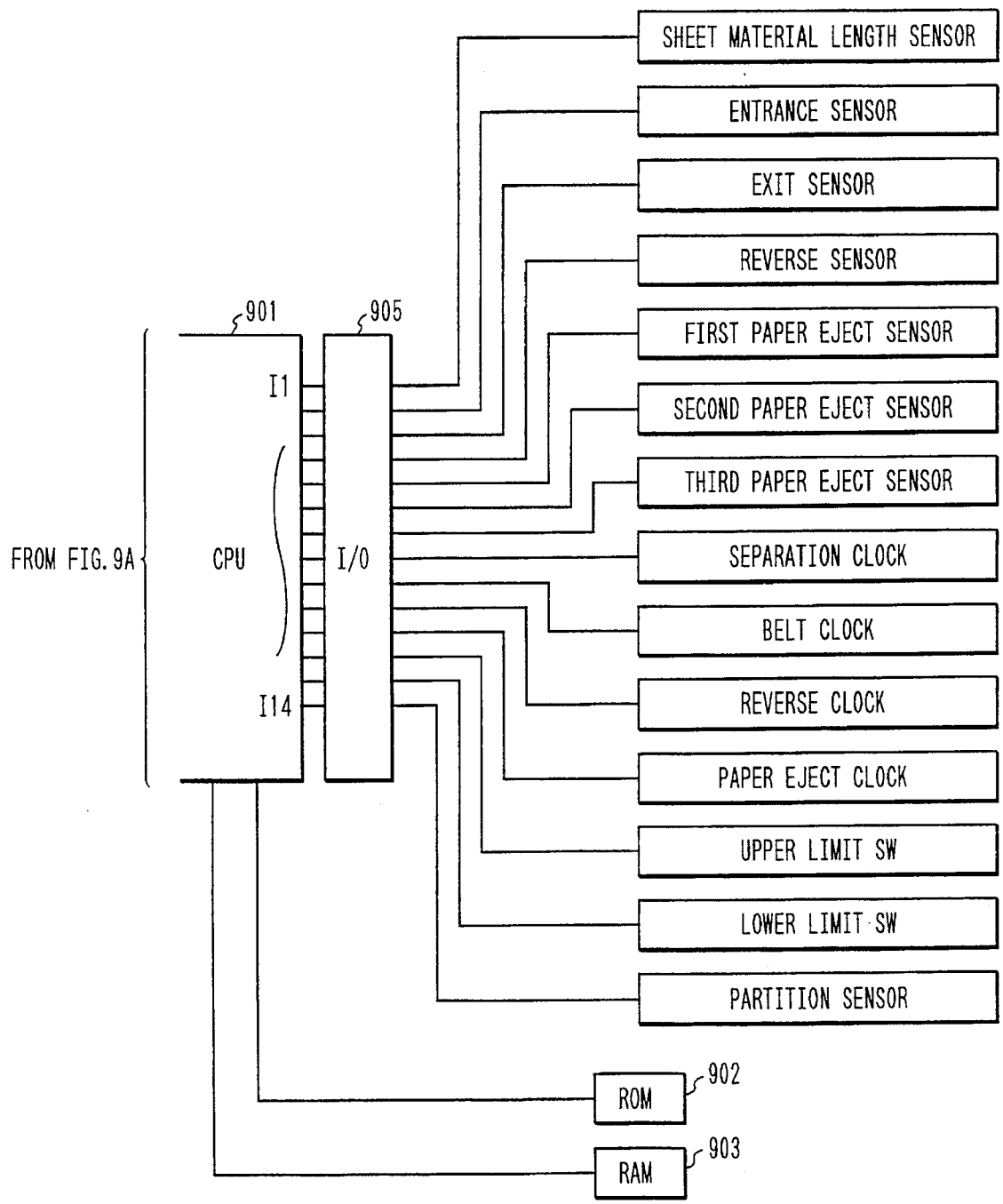
FIG. 9 is comprised of FIGS. 9A and 9B showing block diagrams of a control unit of an automatic document feeder.

FIGS. 9A and 9B are block diagrams showing a circuit construction of the RDF 300 of the embodiment. The RDF 300 has a central processing unit (CPU) 901, a read only memory (ROM) 902, a random access memory (RAM) 903, an output port 904, an input port 905, and the like. A control program is stored in the ROM 902. Input data and data for works have been stored in the RAM 903. Various kinds of motors such as separation motor mentioned above and the like and solenoid driving means are connected to the output port 904. A paper feed sensor and the like are connected to the input port 905. The CPU 901 controls each unit connected through a bus in accordance with the control program stored in the ROM 902. The CPU 901 has a serial interface function and performs a serial communication with the CPU 122 of the reader unit 100 and transmits or receives control data to/from the reader unit 100. As data to be transmitted from the RDF 300 to the reader unit 100, there is a paper feed completion signal indicative of the completion of the paper feed of the original onto the platen glass surface and the like.

H. Control apparatus of easy binding apparatus

Figure 10:
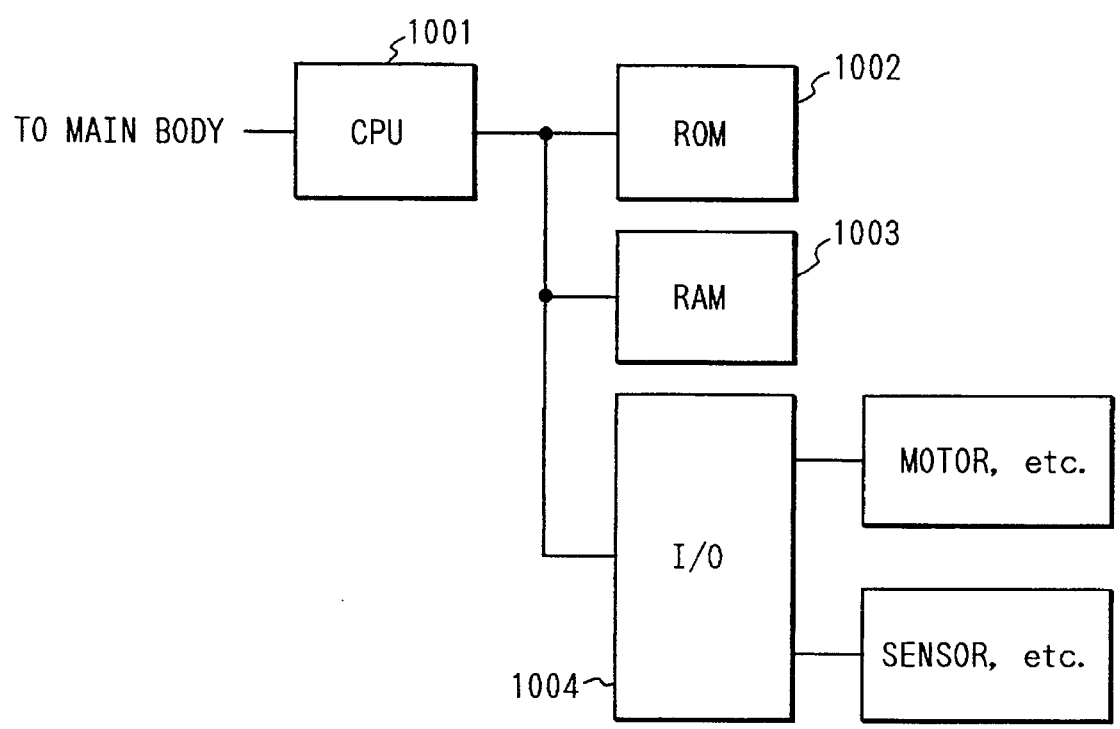
FIG. 10 is a block diagram of a control unit of the sheet post-processing unit.

FIG. 10 is a block diagram showing a circuit construction of the sheet post-processing apparatus 400 of the embodiment. The sheet post-processing apparatus 400 has a central processing unit (CPU) 1001, a read only memory (ROM) 1002, a random access memory (RAM) 1003, an input/output port 1004, and the like. A control program is stored in the ROM 1002. Input data and data for works have been stored in the RAM 1003. Motors, sensors, a switch, and the like are connected to the I/O port 1004. The CPU 1001 controls each unit connected through a bus in accordance with the control program stored in the ROM 1002. The CPU 1001 has a serial interface function and executes a serial communication with the CPU of the printer unit 200 and controls each unit by the signal from the printer unit 200.

Figure 11:
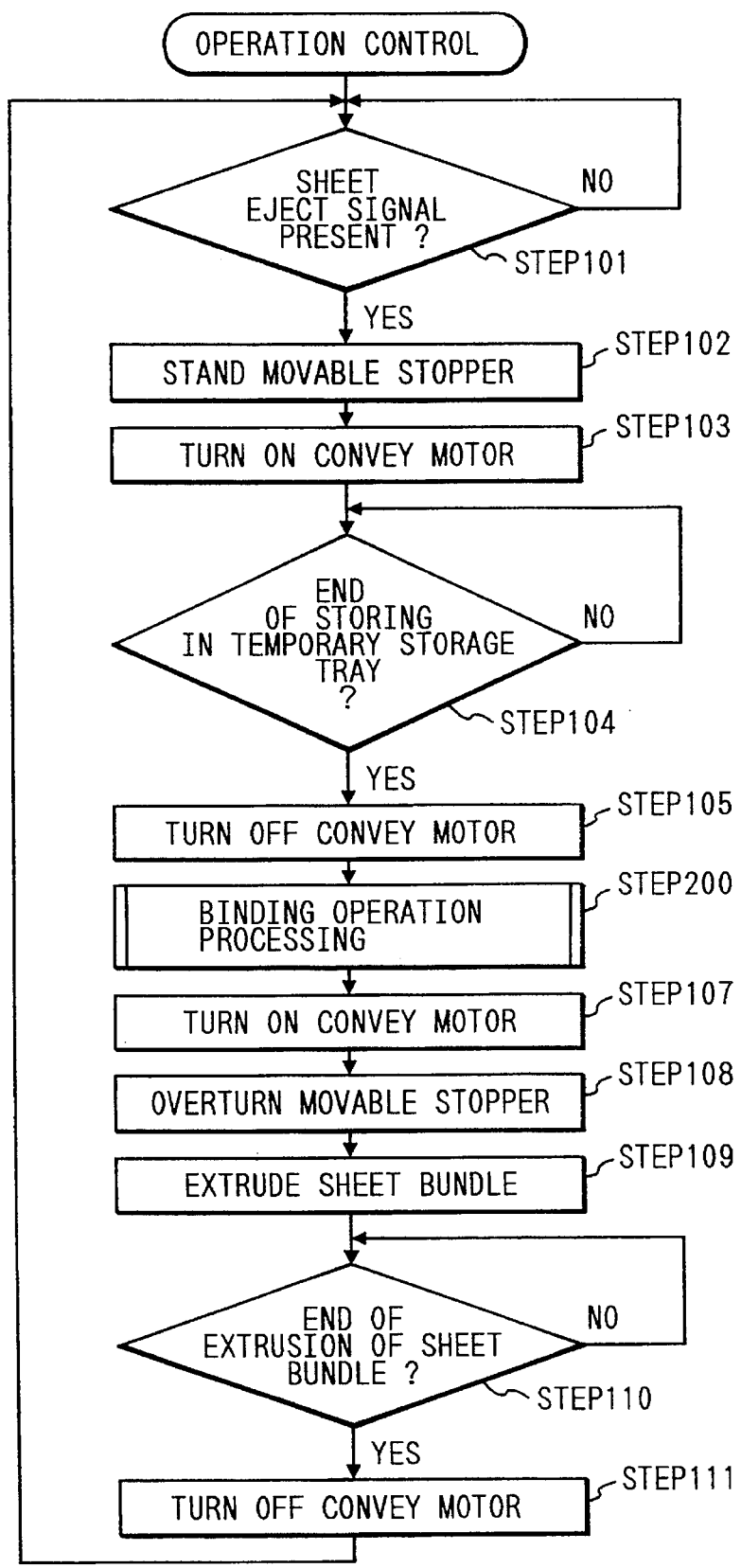
FIG. 11 is a flowchart showing the operation of the embodiment 1.

A flow of an operation control in the embodiment according to the main section of the invention will now be described hereinbelow with reference to a flowchart of FIG. 11.

In step 101, the presence or absence of sheet ejection signals from the copying machine main body (100 and 200) is discriminated. When those signals exist, the movable stopper 409 is allowed to stand so that the sheets can be held in the temporary storage tray unit 408 (step 102). To convey the sheets, the convey motor is turned on (step 103). In step 104, a check is made to see if all of the sheets have completely been moved to the temporary storage tray unit 408 or not. If YES, the convey motor is turned off (step 105). A binding operation processing is executed in step 200. After that, the convey motor is turned on to convey the sheets after completion of the binding process to the ejection tray 403 (step 107). The movable stopper is overturned (step 108). The sheet bundle is extruded in the direction of the ejection tray 403 by the sheet bundle extruding unit 411 (step 109). In step 110, a check is made to see if the extrusion of the sheet bundle to the ejection tray 403 has been finished or not. If YES, the convey motor is turned off (step 111). The processing routine is returned to step 101.

Figure 12:
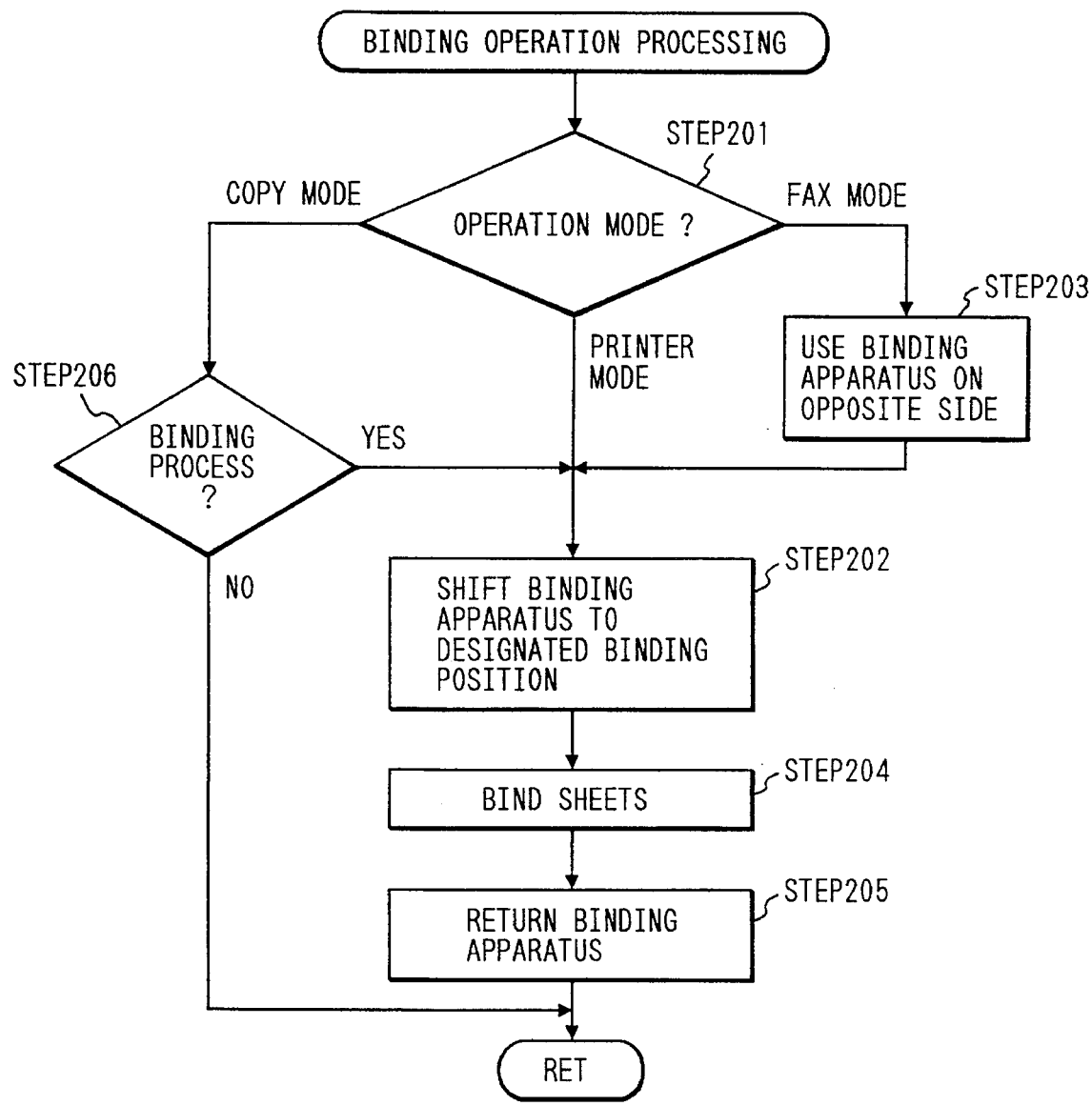
FIG. 12 is a flowchart showing a binding operation processing.

The foregoing binding operation processing will now be described with reference to FIG. 12. In step 201, an operation mode signal that is transmitted from the main body by the communication mentioned above is discriminated. When the operation mode is the copy mode, a check is made to see if a binding processing signal has been transmitted from the main body or not (step 206). If YES, the processing routine advances to step 202. If NO, the sheets are not bound but the processing routine is returned to step 107 in FIG. 11. When the operation mode is the printer mode, the binding apparatus is moved to a position which has previously been designated (step 202). The sheets are bound (step 204). In case of the fax mode, since the facsimile sheet is ejected in face-down state, the binding apparatus at the position on the opposite side is used (step 203) and the sheets are bound (step 204). The binding apparatus is returned to the original position in both of the printer mode and the fax mode (step 205). The processing routine is returned to step 107 in FIG. 11.

Embodiment 2

In the embodiment 2, an actual binding mode and a temporary binding mode are switched by changing a binding method of a stapler and either one of those binding methods is selected in accordance with the binding mode.

Figure 13:
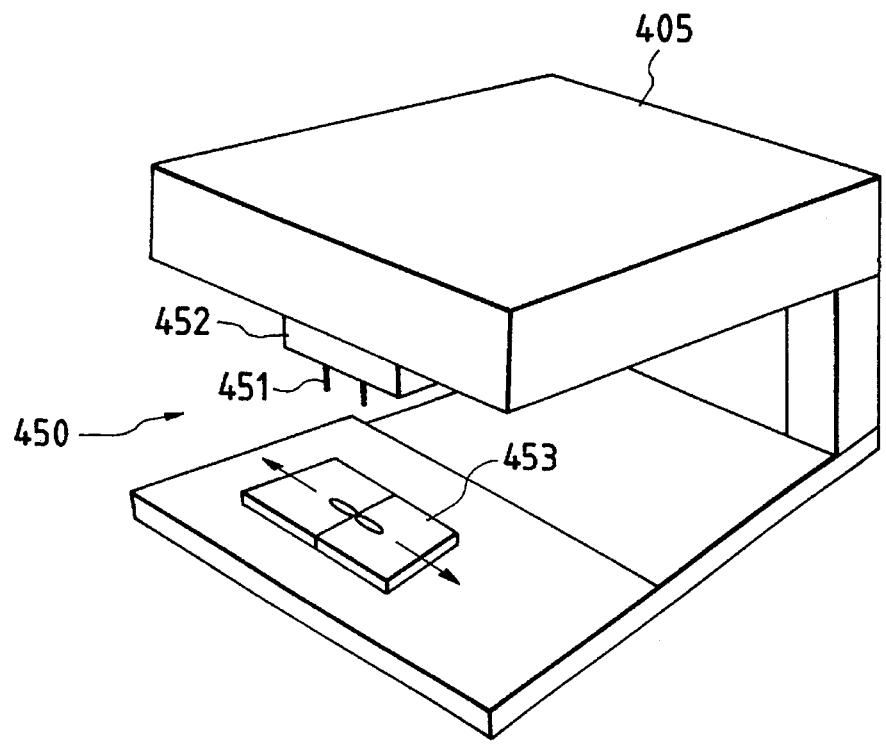
FIG. 13 is a perspective view showing a construction of a binding processing unit which is used in the embodiment 2.

A construction as shown in FIG. 13 is applied to the binding processing unit of the sheet post-processing unit 400. In FIG. 13, a stapler 450 is constructed by a staple needle 451, a staple needle stopper 452, an anvil unit 453 capable of moving in the directions shown by arrows, and pressing means (not shown) for pressing from the upper position. In the embodiment 2, the stapler 450 is replaced to the binding processing unit 410 in FIG. 3. Therefore, the staplers 450 are provided at two positions on the front side and rear side.

By pressing from the upper position by the pressing means, the staple needle 451 is stuck into the sheets. By further depressing, the needle is bent along grooves formed in the anvil unit 453, so that the sheets can be bound.

Figure 14:
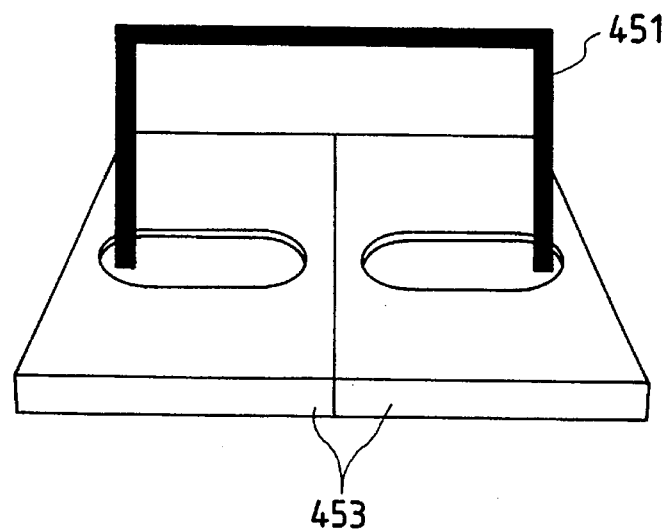
FIG. 14 is a diagram showing a state in which an anvil is closed.
Figure 15:
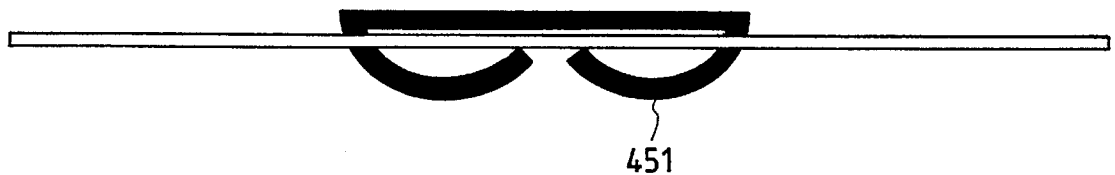
FIG. 15 is a diagram showing a staple according to the state of FIG. 14.

Therefore, when the anvil unit 453 is closed as shown in FIG. 14, an ordinary stapling, namely, the actual binding as shown in FIG. 15 can be performed. When the anvil unit is open as shown in FIG. 16, a stapling such that the staple needle can be easily removed as shown in FIG. 17, namely, a temporary binding can be performed.

Figure 18:
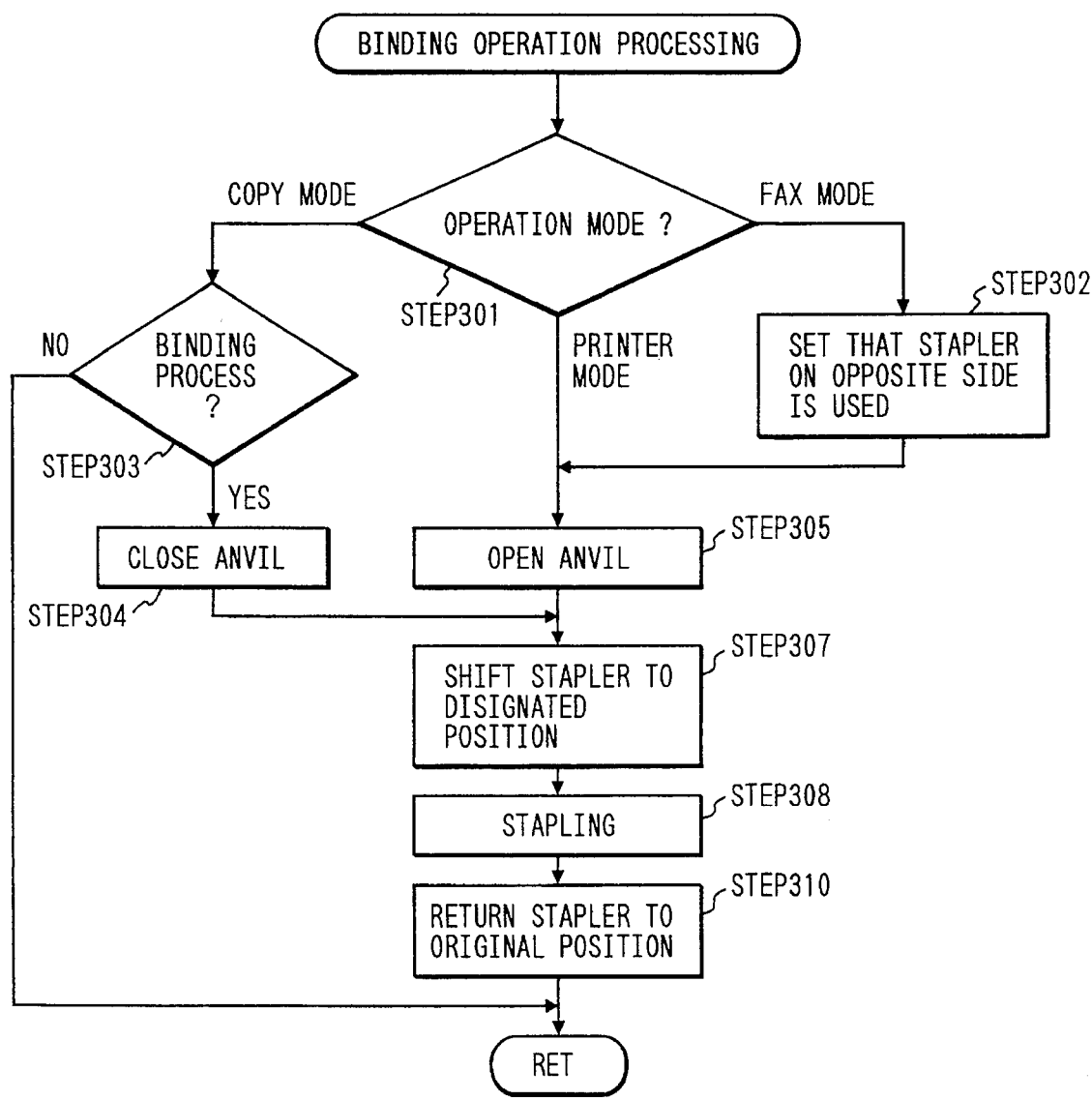
FIG. 18 is a flowchart showing the operation of the embodiment 2.

The binding operation in the embodiment will now be described with reference to FIG. 18. In step 301, the operation mode informed from the main body by the communication is judged. When the operation mode is the copy mode, a check is made to see if the binding processing signal has reached from the main body or not. If YES, the anvil unit 453 of the stapler 450 on the front side as shown in FIG. 14 is closed (step 304). The processing routine advances to step 307. When the binding processing signal is not generated, the sheets are not bound but the processing routine is returned to step 107 in FIG. 11.

Figure 16:
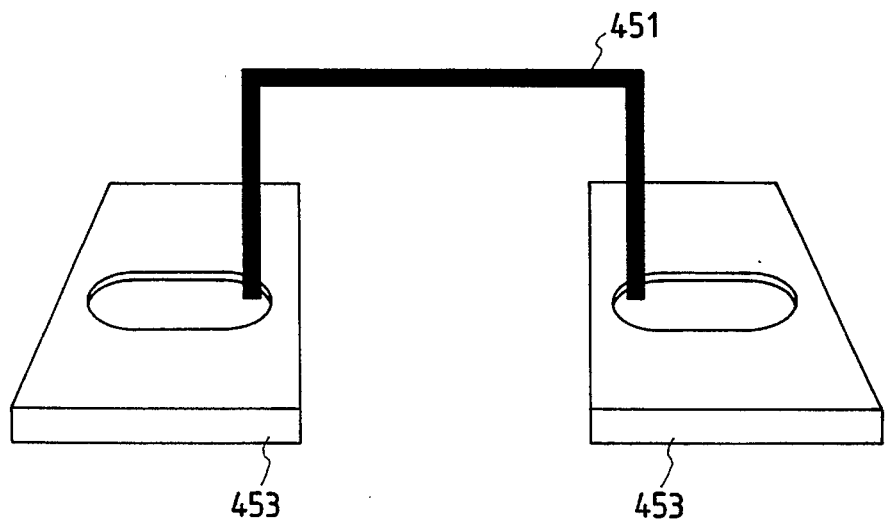
FIG. 16 is a diagram showing a state in which an anvil is open.
Figure 17:
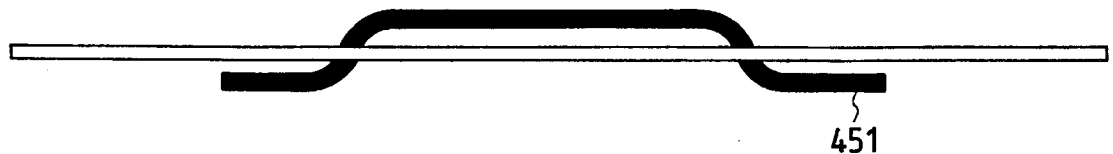
FIG. 17 is a diagram showing a staple according to the state of FIG. 16.

When the operation mode is the printer mode, as shown in FIG. 16, the anvil unit 453 of the stapler 450 on the front side is opened (step 304). The stapler 450 is moved to the position that has previously been designated (step 307). The sheets are stapled (step 308).

In case of the fax mode, since the facsimile paper is ejected in a face-down state, the apparatus is set so as to use the stapler 450 on the rear side at the position on the opposite side (step 302). The anvil unit 453 of the stapler 450 on the rear side is opened (step 304) and the sheets are bound (step 308).

The binding apparatus is returned to the original position in both of the printer mode and fax mode (step 301). The processing routine is returned to step 107 in FIG. 11.

It is also possible to execute the actual binding by the stapler shown in FIG. 13 and to execute the temporary binding by the binding processing section shown in FIG. 4.

What is claimed is:

1. A sheet binding apparatus associated with an image forming apparatus for forming an image onto a sheet in either one of first and second modes, comprising:

storage means for storing sheets ejected from said image forming apparatus; and binding processing means for executing a binding process to the plurality of sheets stored in said storage means, wherein said binding processing means includes first binding processing means for performing a binding process by a first binding method and second binding processing means for performing a binding process by a second binding method which can more easily release a binding than said first binding method, and in the case where said first mode is executed in said image forming apparatus, the binding process is executed by said first binding processing means, and in the case where said second mode is executed, the binding process is executed by said second binding processing means.

2. An apparatus according to claim 1, wherein said binding processing means is a stapler.

3. An apparatus according to claim 2, wherein said stapler has two movable anvils in which grooves to bend a staple are formed, said first binding processing means is said stapler in a state in which said two anvils are closely arranged, and said second binding processing means is said stapler in a state in which said two anvils are away from each other.

4. An apparatus according to claim 1, wherein said first mode is a copy mode and said second mode is a facsimile mode.

5. An apparatus according to claim 1, wherein said first mode is a copy mode and said second mode is a printer mode.

6. A sheet stapling apparatus associated with an image forming apparatus for forming an image onto a sheet, comprising:

storage means for storing sheets ejected from said image forming apparatus; and stapling means for stapling the sheets stored in said storage means, wherein said stapling means has two movable anvils, each of which has a groove to bend a staple, and said stapling means can appropriately select either one of a state in which said two anvils are closely arranged, and a state in which said two anvils are away from each other.

7. A sheet stapling apparatus associated with an image forming apparatus for forming an image onto a sheet, comprising:

storage means for storing sheets ejected from said image forming apparatus; and stapling means for stapling to the sheets stored in said storage means, wherein said stapling means includes first bending means for bending feet of a staple which were pierced through said sheets to the inside and second bending means for bending the feet of the staple which were pierced through the sheets to the outside, wherein said image forming apparatus forms the image in either one of a first mode and a second mode, and in the case where said image forming apparatus executes said first mode, said stapling means executes the stapling process by using said first bending means, and in the case where said second mode is executed, said stapling means executes the stapling process by using said second bending means.

8. An apparatus according to claim 7, wherein said first mode is a copy mode and said second mode is a facsimile mode.

9. An apparatus according to claim 7, wherein said first mode is a copy mode and said second mode is a printer mode.

10. A sheet binding method for binding sheets ejected from an image forming apparatus, the image forming apparatus one that forms an image onto a sheet in either one of first and second modes, and the binding process by one of a first binding method and by a second binding method which can more easily release a binding than said first binding method, the method comprising the steps of:

storing sheets ejected from the image forming apparatus; and executing a binding process to the sheets stored in said storage means, wherein in the case where the first mode is executed in the image forming apparatus, a first binding method is executed, and in the case where the second mode is executed in the image forming apparatus, a second binding method which can more easily release a binding than the first binding method is executed.

11. A method according to claim 10, wherein said binding method is with a stapler.

12. A method according to claim 11, wherein said stapler has two movable anvils in which grooves to bend a staple are formed, the first binding method is with the stapler in a state in which said two anvils are closely arranged, and the second binding method is with the stapler in a state in which the two anvils are away from each other.

13. A method according to claim 10, wherein the first mode is a copy mode and the second mode is a facsimile mode.

14. A method according to claim 10, wherein the first mode is a copy mode and the second mode is a printer mode.

15. A sheet stapling method for use with an image forming apparatus for forming an image onto a sheet and having stapling means with two movable anvils, each of which having a groove to bend a staple, the method comprising the steps of:

storing sheets ejected from said image forming apparatus;

selecting either one of a state in which the two anvils are closely arranged and a state in which said two anvils are away from each other; and stapling the stored sheets.

16. A sheet stapling method for use with an image forming apparatus for forming an image onto a sheet in one of a first mode and a second mode, comprising:

storing sheets ejected from said image forming apparatus; and determining whether said image forming apparatus formed the image in the first mode or the second mode, and in the case where said image forming apparatus formed the image in the first mode, executing the stapling process by bending feet of a staple which were pierced through said sheets to the inside, and in the case where said second mode is executed, executing the stapling process by bending the feet of the staple which were pierced through the sheets to the outside.

17. A method according to claim 16, wherein the first mode is a copy mode and the second mode is a facsimile mode.

18. A method according to claim 16, wherein the first mode is a copy mode and the second mode is a printer mode.

* * * * *

UNITED STATES PATENT AND TRADEMARK OFFICE
CERTIFICATE OF CORRECTION

PATENT NO. : 5,592,280
DATED : January 7, 1997
INVENTOR(S) : Daisuke ISHIZUKA, et al.

It is certified that error appears in the above-indentified patent and that said Letters Patent is hereby corrected as shown below:

<u>COLUMN 4</u>

Line 16, "(d) (e)" should read --(d) - (e)--;

Line 59, "is come" should read --comes--.

Signed and Sealed this

Twenty-fourth Day of June, 1997

*Attest:*

BRUCE LEHMAN

*Attesting Officer*   *Commissioner of Patents and Trademarks*